US012774683B2

(12) United States Patent
Hanrahan et al.

(10) Patent No.: US 12,774,683 B2
(45) Date of Patent: Oct. 27, 2026

(54) INTER-ROTATING ASSEMBLY POWER COUPLING SYSTEM FOR TURBINE ENGINE

(71) Applicant: RTX Corporation, Farmington, CT (US)

(72) Inventors: Paul R. Hanrahan, Sedona, AZ (US); Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/973,929

(22) Filed: Dec. 9, 2024

(65) Prior Publication Data

US 2025/0101921 A1 Mar. 27, 2025

Related U.S. Application Data

(62) Division of application No. 18/205,345, filed on Jun. 2, 2023, now Pat. No. 12,163,476.

(51) Int. Cl.
*F02C 7/32* (2006.01)
*F16H 3/72* (2006.01)
*F16H 48/10* (2012.01)

(52) U.S. Cl.
CPC ............... *F02C 7/32* (2013.01); *F16H 3/727* (2013.01); *F16H 48/10* (2013.01); *F05D 2220/76* (2013.01); *F05D 2260/40311* (2013.01)

(58) Field of Classification Search
CPC .......... F16H 3/724; F16H 3/727; F16H 48/10; F02C 7/32; F02C 7/36; F05D 2220/76; F05D 2260/40311
USPC ............................... 475/31, 5, 149, 150, 207
See application file for complete search history.

(56) References Cited

U.S. PATENT DOCUMENTS

| | | | | |
|---|---|---|---|---|
| 7,351,174 B2 * | 4/2008 | Beutin | F02C 7/36 475/6 |
| 7,882,691 B2 | 2/2011 | Lemmers, Jr. | |
| 7,997,085 B2 | 8/2011 | Moniz | |
| 8,624,415 B2 | 1/2014 | Koenig | |
| 10,273,883 B2 | 4/2019 | Roach | |
| 10,526,975 B2 | 1/2020 | Howell | |
| 10,823,006 B2 | 11/2020 | Leque | |
| 11,186,378 B2 | 11/2021 | Dubreuil | |
| 11,859,558 B2 | 1/2024 | De Wergifosse | |
| 12,163,476 B1 * | 12/2024 | Hanrahan | F16H 3/727 |
| 2017/0248081 A1 * | 8/2017 | Roach | F02C 7/36 |
| 2018/0266329 A1 * | 9/2018 | Mackin | H02K 16/00 |
| 2020/0095930 A1 * | 3/2020 | Blumer | F02C 3/113 |

(Continued)

*Primary Examiner* — Roger L Pang
(74) *Attorney, Agent, or Firm* — Getz Balich LLC

(57) ABSTRACT

An assembly is provided for an aircraft powerplant. This assembly includes a differential geartrain, a first rotating assembly, a second rotating assembly, a first actuator and a second actuator. The differential geartrain includes a sun gear, a ring gear, a plurality of intermediate gears and a carrier. The first rotating assembly is coupled to the differential geartrain through the carrier. The first rotating assembly includes a first turbine rotor. The second rotating assembly is coupled to the differential geartrain through the ring gear. The second rotating assembly includes a second turbine rotor. The first actuator is coupled to the differential geartrain through the ring gear. The second actuator is coupled to the differential geartrain through the sun gear.

18 Claims, 6 Drawing Sheets

(56) References Cited

U.S. PATENT DOCUMENTS

| | | | |
|---|---|---|---|
| 2020/0240331 | A1 | 7/2020 | Kupratis |
| 2023/0332546 | A1 | 10/2023 | Hanrahan |

* cited by examiner

INTER-ROTATING ASSEMBLY POWER COUPLING SYSTEM FOR TURBINE ENGINE

This application is a divisional of U.S. patent application Ser. No. 18/205,345 filed Jun. 2, 2023, which is hereby incorporated herein by reference in its entirety.

BACKGROUND OF THE DISCLOSURE

1. Technical Field

This disclosure relates generally to a turbine engine and, more particularly, to a power coupling system for the turbine engine.

2. Background Information

Various types and configurations of gas turbine engines are known in the art. Various techniques are also known in the art for optimizing power to and from rotating assemblies within a gas turbine engine. While these known techniques have various benefits, there is still room in the art for improvement.

SUMMARY OF THE DISCLOSURE

According to an aspect of the present disclosure, an assembly is provided for an aircraft powerplant. This assembly includes a differential geartrain, a first rotating assembly, a second rotating assembly, a first actuator and a second actuator. The differential geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first rotating assembly is coupled to the differential geartrain through the carrier. The first rotating assembly includes a first turbine rotor. The second rotating assembly is coupled to the differential geartrain through the ring gear. The second rotating assembly includes a second turbine rotor. The first actuator is coupled to the differential geartrain through the ring gear. The second actuator is coupled to the differential geartrain through the sun gear.

According to another aspect of the present disclosure, another assembly is provided for an aircraft powerplant. This assembly includes a differential geartrain, a first rotating assembly, a second rotating assembly, a first electric machine, a second electric machine and an electricity distribution system. The differential geartrain includes a first rotating element, a second rotating element and a third rotating element. The first rotating assembly is coupled to the differential geartrain through the first rotating element. The first rotating assembly includes a first turbine rotor. The second rotating assembly is coupled to the differential geartrain through the second rotating element. The second rotating assembly includes a second turbine rotor. The first electric machine is coupled to the differential geartrain through the third rotating element. The second electric machine is coupled to the differential geartrain through the first rotating element. The electricity distribution system is electrically coupled to the first electric machine and the second electric machine.

According to still another aspect of the present disclosure, another assembly is provided for an aircraft powerplant.

This assembly includes a differential geartrain, a first rotating assembly, a second rotating assembly and a compressor rotor. The differential geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first rotating assembly is coupled to the differential geartrain through the carrier. The first rotating assembly includes a first turbine rotor. The second rotating assembly is coupled to the differential geartrain through the ring gear. The second rotating assembly includes a second turbine rotor. The compressor rotor is coupled to the differential geartrain through the sun gear.

The electricity distribution system may be configured to: receive electricity from the first electric machine and direct electricity into the second electric machine during a first mode of operation; and direct electricity into the first electric machine and receive electricity from the second electric machine during a second mode of operation.

The electricity distribution system may also be configured to receive electricity from the first electric machine and the second electric machine during a third mode of operation.

The electricity distribution system may also be configured to direct electricity into the first electric machine and the second electric machine during a third mode of operation.

The first rotating element may be configured as or otherwise include a carrier. The second rotating element may be configured as or otherwise include a ring gear. The third rotating element may be configured as or otherwise include a sun gear. The differential geartrain may also include a plurality of intermediate gears. The ring gear may circumscribe the sun gear and may be rotatable about an axis. Each of the intermediate gears may be between and meshed with the sun gear and the ring gear. Each of the intermediate gears may be rotatably mounted to the carrier. The carrier may be rotatable about the axis.

The first actuator may be configured as or otherwise include an electric machine.

The electric machine may be configured to: operate as an electric motor during a motor mode of operation; and/or operate as an electric generator during a generator mode of operation.

The second actuator may be configured as or otherwise include an electric machine.

The electric machine may be configured to: operate as an electric motor during a motor mode of operation; and/or operate as an electric generator during a generator mode of operation.

The second actuator may be configured as or otherwise include a compressor.

The second actuator may be configured as or otherwise include a pump.

The differential geartrain may be configured such that the sun gear, the ring gear and the carrier rotate in a common direction about the axis.

The first actuator may be configured as or otherwise include a first electric machine configured to generate electricity during a mode of operation. The second actuator may be configured as or otherwise include a second electric machine configured to drive rotation of the sun gear during the mode of operation.

The first actuator may be configured as or otherwise include a first electric machine configured to drive rotation of the ring gear during a mode of operation. The second actuator may be configured as or otherwise include a second electric machine configured to generate electricity during the mode of operation.

The first actuator may be configured as or otherwise include a first electric machine configured to generate electricity during a mode of operation. The second actuator may be configured as or otherwise include a second electric machine configured to generate electricity during the mode of operation.

The first actuator may be configured as or otherwise include a first electric machine configured to drive rotation of the ring gear during a mode of operation. The second actuator may be configured as or otherwise include a second electric machine configured to drive rotation of the sun gear during the mode of operation.

The assembly may also include a first tower shaft and a second tower shaft. The first rotating assembly may be coupled to the carrier through the first tower shaft. The second rotating assembly may be coupled to the ring gear through the second tower shaft.

The assembly may also include an accessory gearbox including a gearbox geartrain. The first rotating assembly and the second rotating assembly may be coupled to the differential geartrain through the gearbox geartrain.

The first actuator may be coupled to the differential geartrain through the gearbox geartrain.

The second actuator may be coupled to the sun gear independent of the gearbox geartrain.

The first rotating assembly may also include a compressor rotor.

The second rotating assembly may also include a compressor rotor.

The assembly may also include a propulsor rotor coupled to the second turbine rotor. The second turbine rotor may be configured to drive rotation of the propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
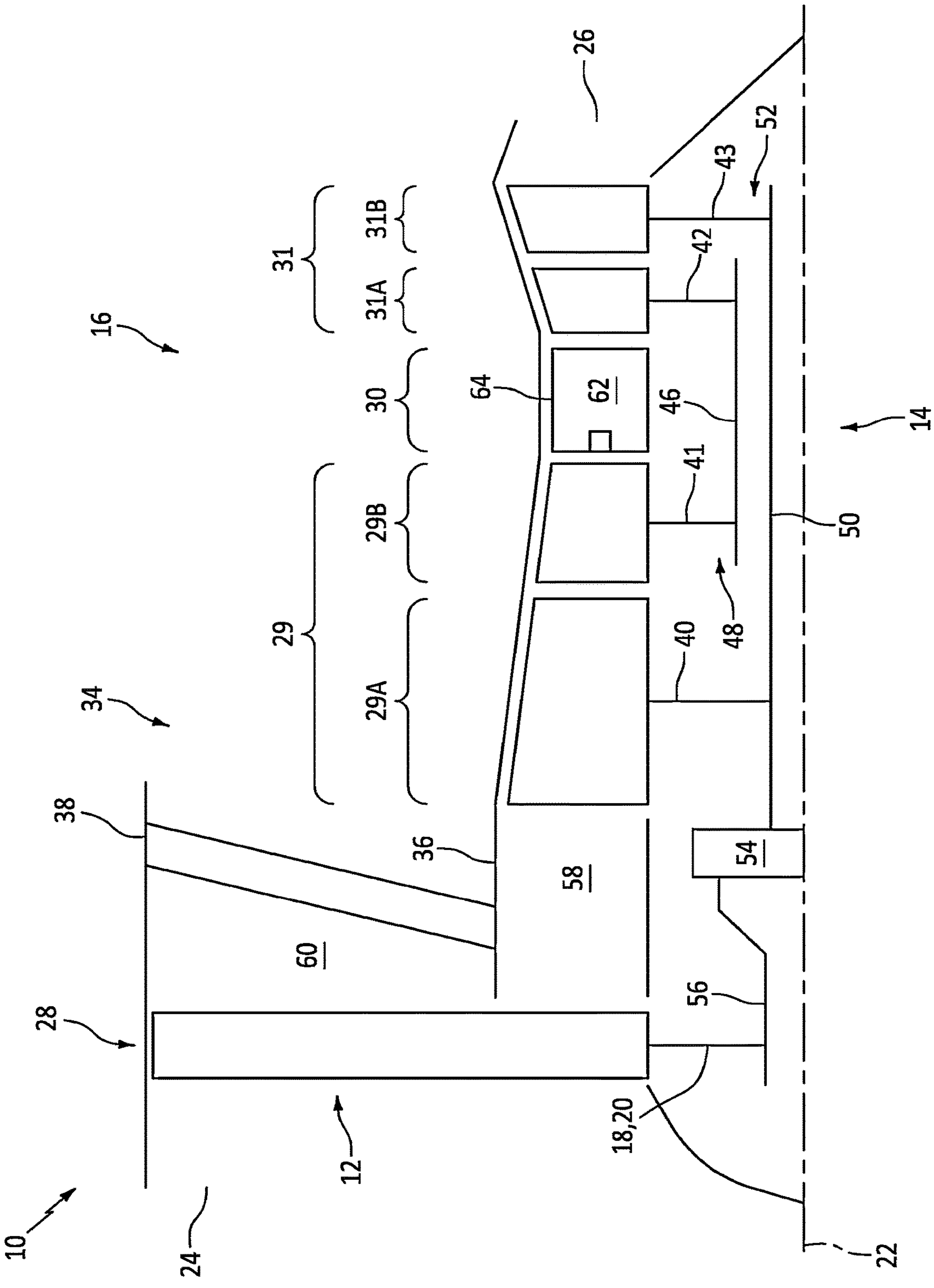
FIG. 1 is a partial schematic sectional illustration of a powerplant for an aircraft.

FIG. 1 illustrates a powerplant 10 for an aircraft. The aircraft may be an airplane, a helicopter, a drone (e.g., an unmanned aerial vehicle (UAV)) or any other manned or unmanned aerial vehicle. The aircraft powerplant 10 may be configured as, or otherwise included as part of, a propulsion system for the aircraft. The aircraft powerplant 10 may also or alternatively be configured as, or otherwise included as part of, an electric power system for the aircraft. However, for ease of description, the aircraft powerplant 10 may be generally described below as the aircraft propulsion system. The aircraft powerplant 10 of FIG. 1 includes a mechanical load 12 and a core 14 of a gas turbine engine 16.

The mechanical load 12 may be configured as or otherwise include a rotor 18 mechanically driven by the engine core 14. This driven rotor 18 may be a bladed propulsor rotor where the aircraft powerplant 10 is, or is part of, the aircraft propulsion system. The propulsor rotor, for example, may be an open (e.g., un-ducted) propulsor rotor or a ducted propulsor rotor. Examples of the open propulsor rotor include, but are not limited to, a propfan rotor for a propfan propulsion system, a pusher fan rotor for a pusher fan propulsion system, a propeller rotor for a turboprop propulsion system, and a rotorcraft rotor (e.g., a main helicopter rotor) for a turboshaft propulsion system. Examples of the ducted propulsor rotor include, but are not limited to, a fan rotor 20 for a turbofan propulsion system, and a (e.g., first stage) compressor rotor for a turbojet propulsion system. Alternatively, the driven rotor 18 may be a generator rotor in an electric power generator where the aircraft powerplant 10 is, or is part of, the electric power system; e.g., an auxiliary power unit (APU) for the aircraft. However, for ease of description, the driven rotor 18 may be generally described below as the fan rotor 20 which is included in the turbine engine 16.

The turbine engine 16 of FIG. 1 extends axially along an axial centerline 22 of the turbine engine 16 from an upstream airflow inlet 24 into the aircraft powerplant 10 and its turbine engine 16 to a combustion products exhaust 26 from the aircraft powerplant 10 and its turbine engine 16. The turbine engine 16 includes a fan section 28 (e.g., where the driven rotor 18 is the fan rotor 20), a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B are arranged sequentially along the axial centerline 22 within an engine housing 34. This engine housing 34 of FIG. 1 includes an inner case 36 (e.g., a core case) and an outer case 38 (e.g., a fan case). The inner case 36 may house the engine core 14, which engine core 14 of FIG. 1 includes the LPC section 29A, the HPC section 29B, the combustor section 30, the HPT section 31A and the LPT section 31B. The outer case 38 may house at least the fan section 28.

Each of the engine sections 29A, 29B, 31A and 31B includes a respective bladed rotor 40-43. Each of these engine rotors 40-43 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The HPC rotor 41 is connected to the HPT rotor 42 through a high speed shaft 46. At least (or only) the HPC rotor 41, the HPT rotor 42 and the high speed shaft 46 may collectively form a high speed rotating assembly 48 in the turbine engine 16 and its engine core 14. The LPC rotor 40 is connected to the LPT rotor 43 through a low speed shaft 50. At least (or only) the LPC rotor 40, the LPT rotor 43 and the low speed shaft 50 may collectively form a low speed rotating assembly 52 in the turbine engine 16 and its engine core 14. This low speed rotating assembly 52 is coupled to (or, may also include) the fan rotor 20. The fan rotor 20 of FIG. 1, for example, is connected to a fan drive geartrain 54 through a fan shaft 56, and the LPT rotor 43 is connected to the fan drive geartrain 54 through the low speed shaft 50. With this arrangement, the fan rotor 20 may rotate at a different (e.g., slower) rotational velocity than the low speed rotating assembly 52 and its LPT rotor 43. However, in other embodiments, it is contemplated the fan drive geartrain 54 may be omitted to provide a direct drive coupling between the LPT rotor 43 and the fan rotor 20. Referring again to FIG. 1, the engine shafts 46, 50 and 56 are rotatably supported within the engine housing 34 by a plurality of bearings; e.g., rolling element and/or thrust bearings. Each of these bearings is connected to the engine housing 34 by at least one stationary structure such as an annular support frame.

During operation, air enters the turbine engine 16 through the airflow inlet 24. This air is directed through the fan section 28 and into a core flowpath 58 and a bypass flowpath 60. The core flowpath 58 extends sequentially through the LPC section 29A, the HPC section 29B, the combustor section 30, the HPT section 31A and the LPT section 31B; e.g., the engine core 14. The air within the core flowpath 58 may be referred to as "core air". The bypass flowpath 60 extends through a bypass duct, which bypass duct is radially outboard of and bypasses the engine core 14. The air within the bypass flowpath 60 may be referred to as "bypass air".

The core air is compressed by the LPC rotor 40 and the HPC rotor 41 and directed into a combustion chamber 62 of a combustor 64 (e.g., annular combustor) in the combustor section 30. Fuel is injected into the combustion chamber 62 and mixed with the compressed core air to provide a fuel-air mixture. This fuel-air mixture is ignited and combustion products thereof flow through and sequentially cause the HPT rotor 42 and the LPT rotor 43 to rotate. The rotation of the HPT rotor 42 and the LPT rotor 43 respectively drive rotation of the HPC rotor 41 and the LPC rotor 40 and, thus, compression of the air received from an inlet into the core flowpath 58. The rotation of the LPT rotor 43 also drives rotation of the fan rotor 20. Rotation of the fan rotor 20 propels the bypass air through and out of the bypass flowpath 60 to provide aircraft thrust. The propulsion of the bypass air may account for a majority of thrust generated by the turbine engine 16.

Figure 2:
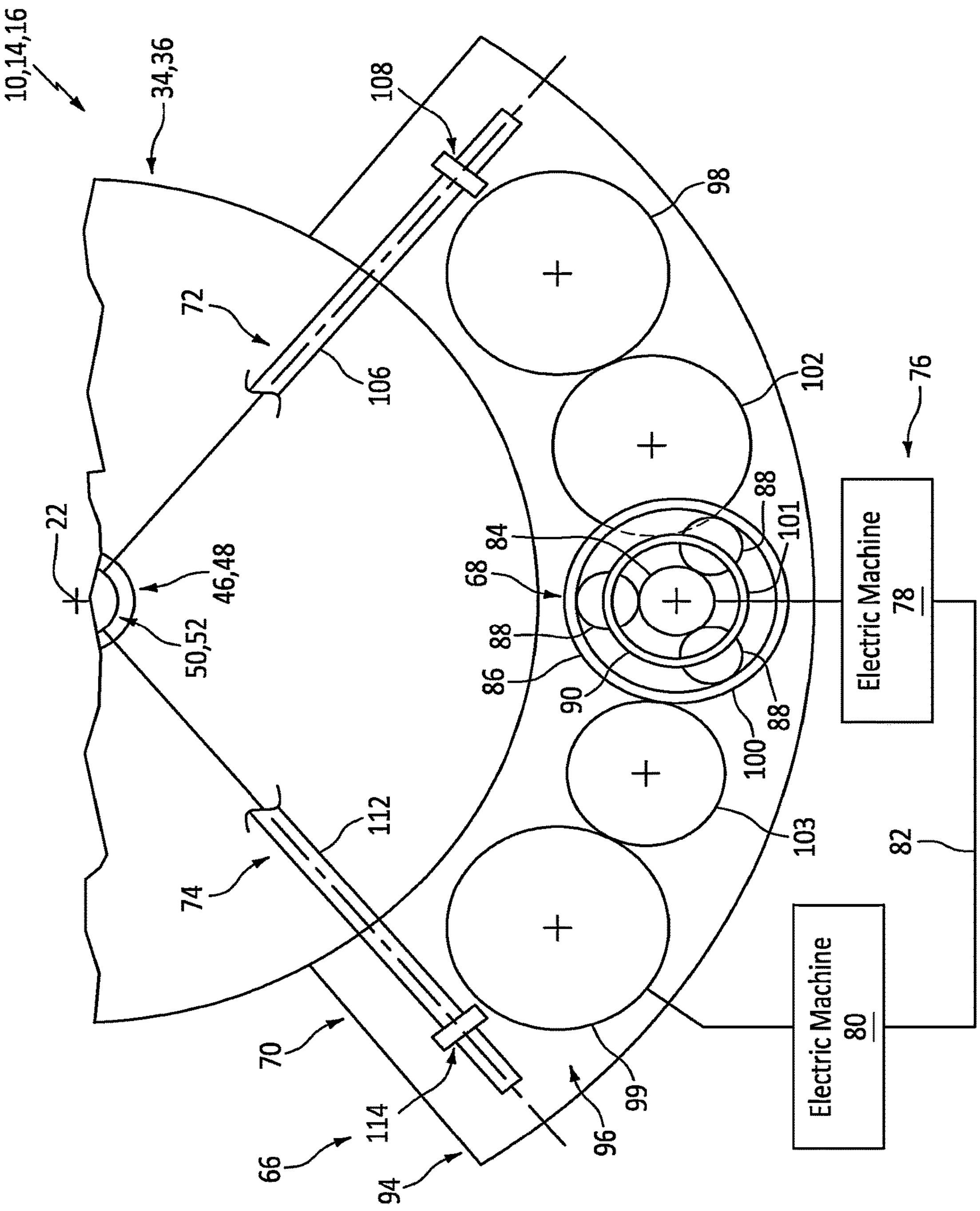
FIG. 2 is a schematic cross-sectional illustration of a portion of the powerplant at a power coupling system.

Referring to FIG. 2, the aircraft powerplant 10 also includes an inter-rotating assembly power coupling system 66. This power coupling system 66 is configured to mechanically couple and operatively interconnect the high speed rotating assembly 48 with the low speed rotating assembly 52. The power coupling system 66 of FIG. 2, for example, includes a differential geartrain 68, a gearbox 70 (e.g., accessory gearbox), a high speed drivetrain 72, a low speed drivetrain 74 and an electric system 76. The electric system 76 of FIG. 2 includes one or more electric machines 78 and 80 and an electricity distribution system 82.

Figure 3:
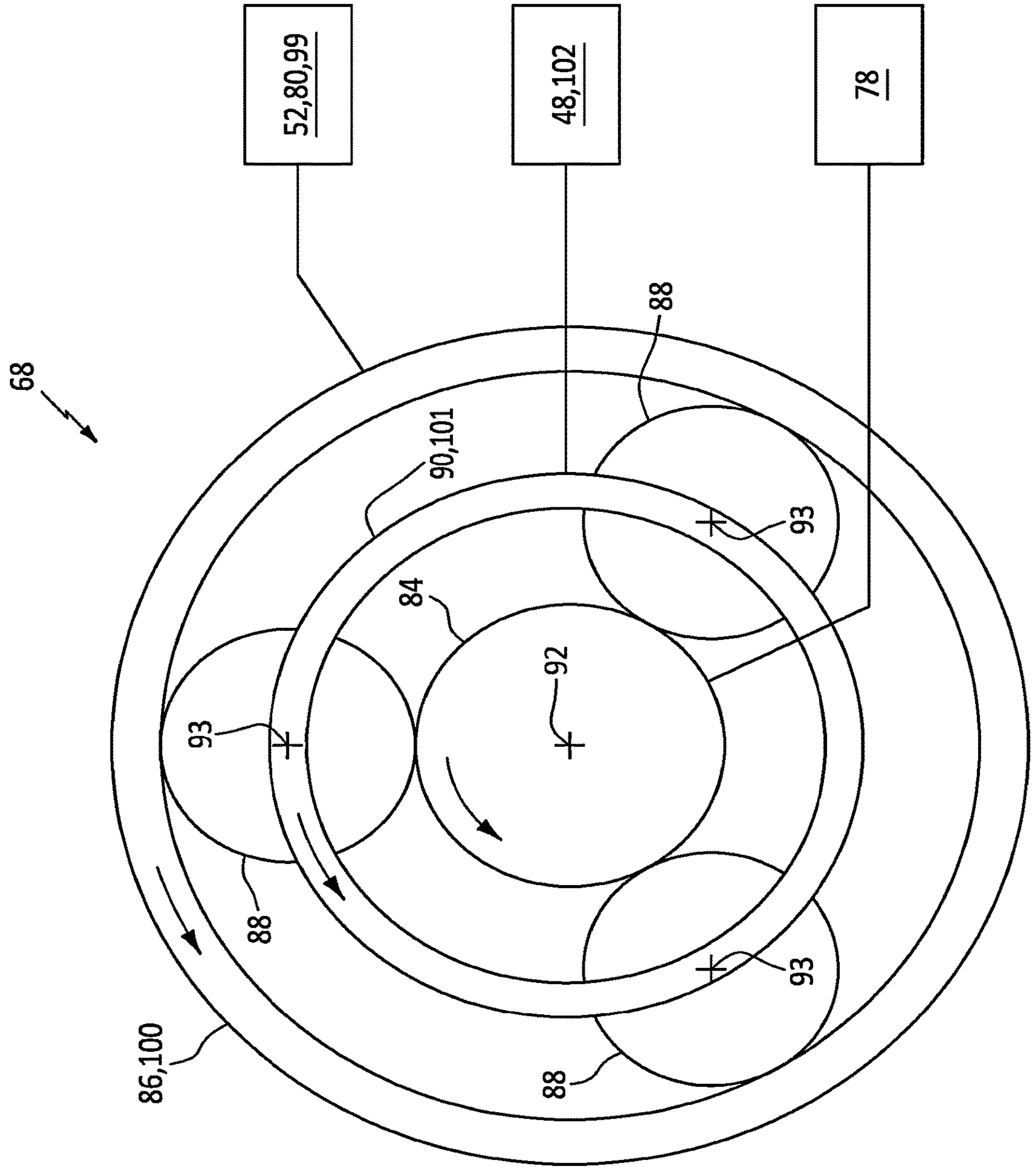
FIG. 3 is a schematic illustration of a differential geartrain coupled to various inputs/outputs.

Referring to FIG. 3, the differential geartrain 68 may be configured as an epicyclic geartrain. The differential geartrain 68 of FIG. 3 includes a sun gear 84, a ring gear 86, a plurality of intermediate gears 88 and a carrier 90. The sun gear 84 is rotatable about a rotational axis 92, which rotational axis 92 may be a centerline axis of the differential geartrain 68 and its rotating elements 84, 86 and 90. The ring gear 86 circumscribes the sun gear 84, and the ring gear 86 is rotatable about the rotational axis 92. Each of the intermediate gears 88 is disposed (e.g., radially) between and meshed with the sun gear 84 and the ring gear 86. Each of the intermediate gears 88 is rotatably mounted to the carrier 90, and rotatable about a respective intermediate gear rotational axis 93. The carrier 90 is rotatable about the rotational axis 92. The differential geartrain 68 may be configured such that the sun gear 84, the ring gear 86 and the carrier 90 may all rotate in a common direction of rotation during normal operation. With this arrangement, where the carrier 90 delivers power through the intermediate gears 88 to aid rotation of the sun gear 84, the carrier 90 also simultaneously delivers power through the intermediate gears 88 to aid rotation of the ring gear 86. In addition, where the carrier 90 retards rotation of the sun gear 84, the carrier 90 also retards rotation of the ring gear 86.

Referring to FIG. 2, the gearbox 70 includes a gearbox housing 94 and a gearbox geartrain 96 housed within the gearbox housing 94. The gearbox 70 and its gearbox housing 94 of FIG. 2 are located radially outboard of and mounted to the engine housing 34 and its inner case 36. The present disclosure, however, is not limited to such an exemplary gearbox location.

The gearbox geartrain 96 includes one or more drive gears 98-101 and one or more idler gears 102 and 103. Each of these gearbox gears 98-103 is rotatably mounted within the gearbox housing 94. The first drive gear 98 is disposed at (e.g., on, adjacent or proximate) a first end of the gearbox housing 94. The second drive gear 99 is disposed at a second end of the gearbox housing 94. The third drive gear 100 is disposed laterally between the first drive gear 98 and the second drive gear 99. This third drive gear 100 is also rotatable with the ring gear 86 of the differential geartrain 68. The third drive gear 100, for example, may be coupled to or integrated as part of the ring gear 86 of the differential geartrain 68. The fourth drive gear 101 of FIG. 2 is coaxial with the third drive gear 100 and is disposed laterally between the first drive gear 98 and the second drive gear 99. This fourth drive gear 101 is also rotatable with the carrier 90 of the differential geartrain 68. The fourth drive gear 101, for example, may be coupled to or integrated as part of the carrier 90 of the differential geartrain 68. Briefly, with such an arrangement, the differential geartrain 68 may also be housed within the gearbox housing 94 and, thus, radially outboard of at least the inner case 36 of the engine housing 34. The first idler gear 102 is disposed laterally between and meshed with the first drive gear 98 and the fourth drive gear 101. The second idler gear 103 is disposed laterally between and meshed with the second drive gear 99 and the third drive gear 100. The differential geartrain 68 thereby mechanically and operatively couples the first drive gear 98 with the second drive gear 99.

Figure 4:
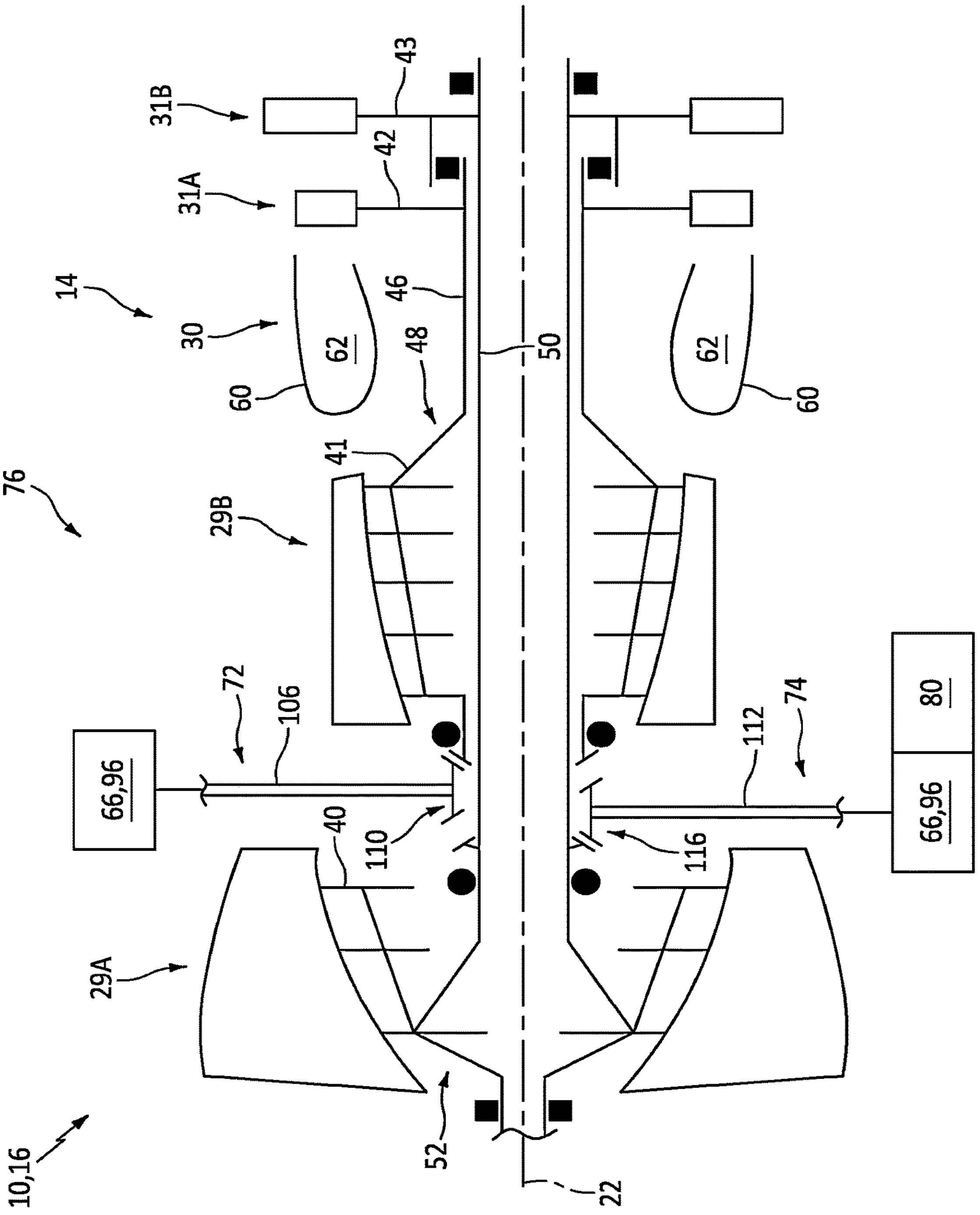
FIG. 4 is a schematic sectional illustration of a portion of the powerplant at the power coupling system.

The high speed drivetrain 72 is configured to mechanically couple and operatively interconnect the gearbox geartrain 96 to the high speed rotating assembly 48. The high speed drivetrain 72 of FIG. 2, for example, includes a high speed tower shaft 106. This high speed tower shaft 106 extends longitudinally (e.g., in a radial direction relative to the axial centerline 22) between an inner end of the high speed tower shaft 106 and an outer end of the high speed tower shaft 106. The outer end of the high speed tower shaft 106 is coupled to the first drive gear 98 through an outer coupling 108; e.g., a pinion gear-to-ring gear coupling. Referring to FIG. 4, the inner end of the high speed tower shaft 106 is coupled to the high speed rotating assembly 48 and its high speed shaft 46 through an inner coupling 110; e.g., a pinion gear-to-ring gear coupling.

Referring to FIG. 2, the low speed drivetrain 74 is configured to mechanically couple and operatively interconnect the gearbox geartrain 96 to the low speed rotating assembly 52. The low speed drivetrain 74 of FIG. 2, for example, includes a low speed tower shaft 112. This low speed tower shaft 112 extends longitudinally (e.g., in the radial direction relative to the axial centerline 22) between an inner end of the low speed tower shaft 112 and an outer end of the low speed tower shaft 112. The outer end of the low speed tower shaft 112 is coupled to the second drive gear 99 through an outer coupling 114; e.g., a pinion gear-to-ring gear coupling. Referring to FIG. 4, the inner end of the low speed tower shaft 112 is coupled to the low speed rotating assembly 52 and its low speed shaft 50 through an inner coupling 116; e.g., a pinion gear-to-ring gear coupling.

Referring to FIGS. 2 and 4, each of the electric machines 78, 80 may be disposed outside of the engine core 14. Each electric machine 78, 80, for example, may be radially outboard of the inner case 36 of the engine housing 34 and mounted to the gearbox 70 and its gearbox housing 94. The present disclosure, however, is not limited to such an exemplary electric machine location.

Figure 5:
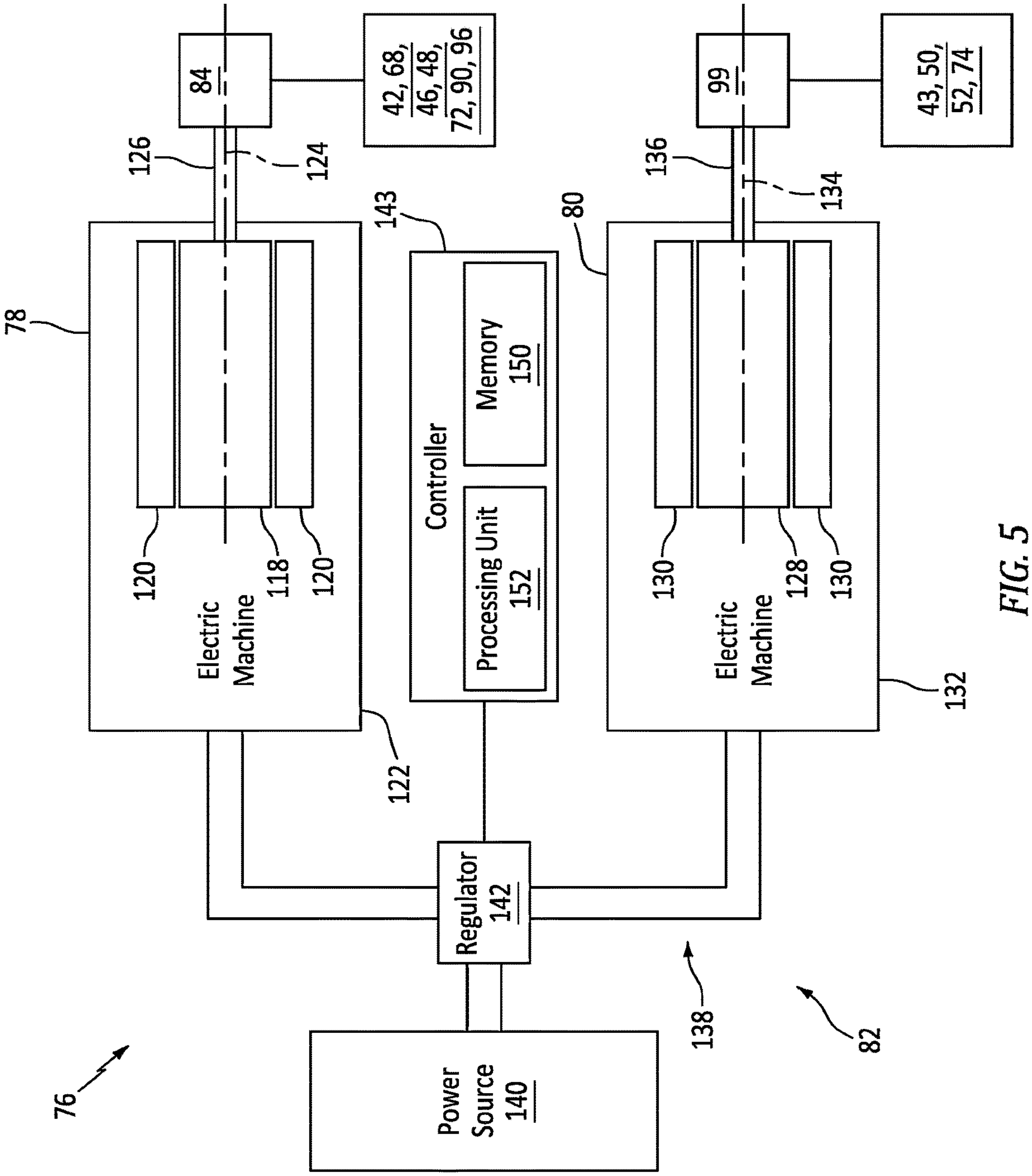
FIG. 5 is a schematic illustration of an electric system coupled to various other components of the power coupling system.

Referring to FIG. 5, the differential electric machine 78 includes a differential electric machine rotor 118 ("differential machine rotor"), a differential electric machine stator 120 ("differential machine stator") and a differential electric machine housing 122 ("differential machine housing"). The differential machine rotor 118 is rotatable about a rotational axis 124 of the differential machine rotor 118, which rotational axis 124 may also be an axial centerline of the differential electric machine 78. This differential machine rotor 118 is configured to drive rotation of and/or be rotationally driven by the sun gear 84. The differential machine rotor 118 of FIG. 5, for example, is coupled to and rotatable with the sun gear 84 through a driveshaft 126. The differential machine rotor 118, of course, may also or alternatively be coupled to the sun drive gear through one or more other power transfer/coupling devices. The differential machine stator 120 of FIG. 5 is radially outboard of and circumscribes the differential machine rotor 118. With this arrangement, the differential electric machine 78 is configured as a radial flux electric machine. The differential electric machine 78 of the present disclosure, however, is not limited to such an exemplary rotor-stator configuration nor to radial flux arrangements. The differential machine rotor 118, for example, may alternatively be radially outboard of and circumscribe the differential machine stator 120. In another example, the differential machine rotor 118 may be axially next to the differential machine stator 120 configuring the differential electric machine 78 as an axial flux electric machine. Referring again to FIG. 5, the differential machine rotor 118 and the differential machine stator 120 are at least partially or completely housed within the differential machine housing 122.

The differential electric machine 78 of FIG. 5 may be configurable as an electric generator and/or an electric motor. For example, during a generator mode of operation, the differential electric machine 78 may operate as the electric generator to convert mechanical power received from, for example, the high speed rotating assembly 48 and its HPT rotor 42 into electricity. The high speed rotating assembly 48 and its HPT rotor 42, for example, may drive rotation of the differential machine rotor 118 through the high speed drivetrain 72, the gearbox geartrain 96 and the differential geartrain 68 via its carrier 90. The rotation of the differential machine rotor 118 may generate an electromagnetic field with the differential machine stator 120, and the differential machine stator 120 may convert energy from the electromagnetic field into the electricity. The differential electric machine 78 may then provide this electricity to the electricity distribution system 82 for further use. During a motor mode of operation, the differential electric machine 78 may operate as the electric motor to convert electricity received from the electricity distribution system 82 into mechanical power. The differential machine stator 120, for example, may generate an electromagnetic field with the differential machine rotor 118 using the electricity. This electromagnetic field may drive rotation of the differential machine rotor 118. The differential machine rotor 118 may thereby drive rotation of the high speed rotating assembly 48 and its HPC rotor 41 through the high speed drivetrain 72, the gearbox geartrain 96 and the differential geartrain 68 via its sun gear 84. This mechanical power may be provided to the high speed rotating assembly 48 to boost power or completely power rotation of the HPC rotor 41 (see FIGS. 1 and 4). Of course, in other embodiments, the differential electric machine 78 may alternatively be configured as a dedicated electric generator (e.g., without the electric motor functionality), or as a dedicated electric motor (e.g., without the electric generator functionality).

Referring still to FIG. 5, the gearbox electric machine 80 includes a gearbox electric machine rotor 128 ("gearbox machine rotor"), a gearbox electric machine stator 130 ("gearbox machine stator") and a gearbox electric machine housing 132 ("gearbox machine housing"). The gearbox machine rotor 128 is rotatable about a rotational axis 134 of the gearbox machine rotor 128, which rotational axis 134 may also be an axial centerline of the gearbox electric machine 80. This gearbox machine rotor 128 is configured to drive rotation of and/or be rotationally driven by the second drive gear 99. The gearbox machine rotor 128 of FIG. 5, for example, is coupled to and rotatable with the second drive gear 99 through a driveshaft 136. The gearbox machine rotor 128, of course, may also or alternatively be coupled to the second drive gear 99 through one or more other power transfer/coupling devices. The gearbox machine stator 130 of FIG. 5 is radially outboard of and circumscribes the gearbox machine rotor 128. With this arrangement, the gearbox electric machine 80 is configured as a radial flux electric machine. The gearbox electric machine 80 of the present disclosure, however, is not limited to such an exemplary rotor-stator configuration nor to radial flux arrangements. The gearbox machine rotor 128, for example, may alternatively be radially outboard of and circumscribe the gearbox machine stator 130. In another example, the gearbox machine rotor 128 may be axially next to the gearbox machine stator 130 configuring the gearbox electric machine 80 as an axial flux electric machine. Referring again to FIG. 5, the gearbox machine rotor 128 and the gearbox machine stator 130 are at least partially or completely housed within the gearbox machine housing 132.

The gearbox electric machine 80 of FIG. 5 may be configurable as an electric generator and/or an electric motor. For example, during a generator mode of operation, the gearbox electric machine 80 may operate as the electric generator to convert mechanical power received from, for example, the low speed rotating assembly 52 and its LPT rotor 43 into electricity. The low speed rotating assembly 52 and its LPT rotor 43, for example, may drive rotation of the gearbox machine rotor 128 through the low speed drivetrain 74 and the gearbox geartrain 96 via its second drive gear 99. The rotation of the gearbox machine rotor 128 may generate an electromagnetic field with the gearbox machine stator 130, and the gearbox machine stator 130 may convert energy from the electromagnetic field into the electricity. The gearbox electric machine 80 may then provide this electricity to the electricity distribution system 82 for further use. During a motor mode of operation, the gearbox electric machine 80 may operate as the electric motor to convert electricity received from the electricity distribution system 82 into mechanical power. The gearbox machine stator 130, for example, may generate an electromagnetic field with the gearbox machine rotor 128 using the electricity. This electromagnetic field may drive rotation of the gearbox machine rotor 128. The gearbox machine rotor 128 may thereby drive rotation of the low speed rotating assembly 52 and its LPC rotor 40 and/or the fan rotor 20 through the low speed drivetrain 74 and the gearbox geartrain 96 via its second drive gear 99. This mechanical power may be provided to the low speed rotating assembly 52 to boost power or completely power rotation of the LPC rotor 40 and/or the fan rotor 20. Of course, in other embodiments, the gearbox electric machine 80 may alternatively be configured as a dedicated electric generator (e.g., without the electric motor functionality), or as a dedicated electric motor (e.g., without the electric generator functionality).

Referring back to FIGS. 2 and 3, the high speed drivetrain 72 is mechanically coupled through the differential geartrain 68 to both the differential electric machine 78 and to the low speed drivetrain 74. With this arrangement, as the high speed drivetrain 72 delivers power to the differential electric machine 78 for electric power generation, the high speed drivetrain 72 also delivers power to the low spool drivetrain 74. Also, as the high speed drivetrain 72 receives power from the differential electric machine 78 when operating as the electric motor, the high speed drivetrain 72 also extracts power from the low speed drivetrain 74.

The electricity distribution system 82 of FIG. 5 includes an electricity bus 138 and a power source 140. The electricity distribution system 82 may also include an electricity regulator 142 (e.g., one or more switches) and a controller 143. The electricity bus 138 is electrically coupled to the differential electric machine 78 and its differential machine stator 120, the gearbox electric machine 80 and its gearbox machine stator 130 and the power source 140. This electricity bus 138 may be configured as or otherwise include one or more high voltage electric lines. The power source 140 is configured to store electricity received from one or more of the electric machines 78 and 80 through the electricity bus 138. The power source 140 is also configured to provide the stored electricity to one or more of the electric machines 78 and 80 through the electricity bus 138. The power source 140, for example, may be configured as or otherwise include one or more batteries (or battery stacks) and/or one or more other power storage devices. The electricity regulator 142 is configured to regulate the flow of electricity across the electricity bus 138. The electricity regulator 142, for example, may direct electricity from the power source 140 to one or both the electric machines 78 and 80. In another example, the electricity regulator 142 may direct electricity generated by one or both of the electric machines 78 and 80 to the power source 140 for storage, and/or other electrically powered aircraft systems and/or to one or more other components. In still another example, the electricity regulator 142 may direct electricity generated by one of the electric machines 78, 80 to the other electric machine 80, 78 and/or the power source 140. With the foregoing arrangement, the electric system 76 of FIG. 5 may facilitate power transfer between the engine rotating assemblies 48 and 52.

The controller 143 is in signal communication (e.g., hardwired and/or wirelessly coupled) with the electricity regulator 142. The controller 143 may be configured as an onboard engine controller or discrete from the onboard engine controller. The controller 143 may be implemented with a combination of hardware and software. The hardware may include memory 150 and at least one processing unit 152, which processing unit 152 may include one or more single-core and/or multi-core processors. The hardware may also or alternatively include analog and/or digital circuitry other than that described above.

The memory 150 is configured to store software (e.g., program instructions) for execution by the processing unit 152, which software execution may control and/or facilitate performance of one or more operations such as those described below. The memory 150 may be a non-transitory computer readable medium. For example, the memory 150 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Referring to FIGS. 2, 4 and 5, during a mode of operation to boost power to the low speed rotating assembly 52 ("LS structure boost mode"), the electric system 76 may extract power from the high speed rotating assembly 48 and provide at least some or all of that extracted power to the low speed rotating assembly 52. The differential electric machine 78, for example, may operate as the electric generator which is rotationally driven by the high speed rotating assembly 48. The electricity regulator 142 may direct at least some or all of the electricity generated by the differential electric machine 78 to the gearbox electric machine 80. The gearbox electric machine 80 may operate as the electric motor to drive rotation of the low speed rotating assembly 52. Power generated using the LPT rotor 43 may thereby be boosted with power generated by the high speed rotating assembly 48 and its HPT rotor 42 through the electric system 76. Moreover, as the differential electric machine 78 extracts power through the differential geartrain 68, the differential geartrain 68 extracts additional power from the high speed rotating assembly 48 and delivers mechanical power to the low speed rotating assembly 52. The total amount of mechanical and electrical power transferred during the "LS structure boost mode" may thereby be significantly higher than what the electric machines 78 and 80 could transfer alone.

During a mode of operation to boost power to the high speed rotating assembly 48 ("HS structure boost mode"), the electric system 76 may extract power from the low speed rotating assembly 52 and provide at least some or all of that extracted power to the high speed rotating assembly 48. The gearbox electric machine 80, for example, may operate as the electric generator which is rotationally driven by the low speed rotating assembly 52. The electricity regulator 142 may direct at least some or all of the electricity generated by the gearbox electric machine 80 to the differential electric machine 78. The differential electric machine 78 may operate as the electric motor to drive rotation of the high speed rotating assembly 48. Power generated using the HPT rotor 42 may thereby be boosted with power generated by the low speed rotating assembly 52 and its LPT rotor 43 through the electric system 76. Moreover, as the differential electric machine 78 delivers power through the differential geartrain 68, the differential geartrain 68 also extracts mechanical power from the low speed rotating assembly 52. The total amount of mechanical and electrical power transferred during the HS structure boost mode may thereby be significantly higher than what the electric machines 78 and 80 could transfer alone.

During a mode of operation to boost power to both rotating assemblies 48 and 52 ("full boost mode"), the electric system 76 may use power stored in the power source 140 to provide power to the high speed rotating assembly 48 and the low speed rotating assembly 52. The electricity regulator 142, for example, may direct electricity from the power source 140 selectively (e.g., evenly or unevenly) to the differential electric machine 78 and the gearbox electric machine 80. The differential electric machine 78 may operate as the electric motor to drive rotation of the high speed rotating assembly 48. Power generated using the HPT rotor 42 may thereby be boosted with the power stored within the power source 140 through the electric system 76. Similarly, the gearbox electric machine 80 may operate as the electric motor to drive rotation of the low speed rotating assembly 52. Power generated using the LPT rotor 43 may thereby be boosted with the power stored within the power source 140 through the electric system 76.

During a power storage mode of operation, the electric system 76 may extract power from both the high speed rotating assembly 48 and the low speed rotating assembly 52 and provide that extracted power to the power source 140 for storage (and/or to one or more other electrically powered aircraft systems and/or components). The differential electric machine 78, for example, may operate as the electric generator which is rotationally driven by the high speed rotating assembly 48. The electricity regulator 142 may direct at least some or all of the electricity generated by the differential electric machine 78 to the power source 140 (or otherwise). Similarly, the gearbox electric machine 80 may operate as the electric generator which is rotationally driven by the low speed rotating assembly 52. The electricity regulator 142 may direct at least some or all of the electricity generated by the gearbox electric machine 80 to the power source 140 (or otherwise). Concurrently, the gearbox electric machine 80 may operate as the electric generator which is rotationally driven by the low speed rotating assembly 52, and the differential electric machine 78 may operate as the electric generator which is rotationally driven by the high speed rotating assembly 48. The electricity regulator 142 may direct at least some or all of the electricity generated by the differential electric machine 78 and the gearbox electric machine 80 to the power source 140 (or otherwise).

In addition to facilitating power transfer between the high speed rotating assembly 48 and the low speed rotating assembly 52, the power coupling system 66 may also provide a power multiplier. More particularly, arrangement of the differential geartrain 68 of FIG. 2 between the high speed rotating assembly 48 and the low speed rotating assembly 52 provides a power multiplier. An example of this power multiplication is outlined below in Table 1. In this example, the sun gear 84 is sized with a 1.0× diameter (e.g., a contact pitch diameter), the carrier 90 is sized with a 1.5× diameter (e.g., a diameter to location of intermediate gear rotational axes), and the ring gear 86 is sized with a 2.0× diameter (e.g., a contact pitch diameter), where X is a dimensional value. In addition, each electric machine 78, 80 is configured as a 200 kilowatt (kW) motor-generator, and it is assumed the aircraft propulsion system utilizes 100 kilowatts for producing thrust at full power and the aircraft utilizes a constant 150 kilowatts during aircraft operation. The present disclosure, of course, is not limited to the foregoing exemplary values or ratios.

TABLE 1

| | | | Maintain Load | |
|---|---|---|---|---|
| | | Baseline | Bias Hi | Bias Lo |
| HPX to Aircraft | | 150 | 150 | 150 |
| Gen Dif | kW | 75 | 200 | −50 |
| Gen Lo | kW | 75 | −50 | 200 |
| HPX from Lo | kW | 15 | −210 | 240 |
| HPX from Hi | kW | 135 | 360 | −90 |
| Dif Mult Lo | | −.80 | −.80 | −.80 |
| Dif Mult Hi | | 1.80 | 1.80 | 1.80 |

The controller 143 may control the electricity regulator 142 to regulate the flow of electricity across the electricity bus 138 and make available a portion of the mechanical power extracted from the powerplant 10 as electric power to an aircraft electricity bus. The controller 143 may maintain a supply of electric power to the aircraft electricity bus generated from one or both of the electric machines 78 and 80 in the generator mode. Alternatively, the gearbox electric machine 80 may operate as the electric generator and the differential electric machine 78 may operate as the motor. Alternatively, the differential electric machine 78 may operate as the electric generator and the gearbox electric machine 80 may operate as the motor.

Figure 6:
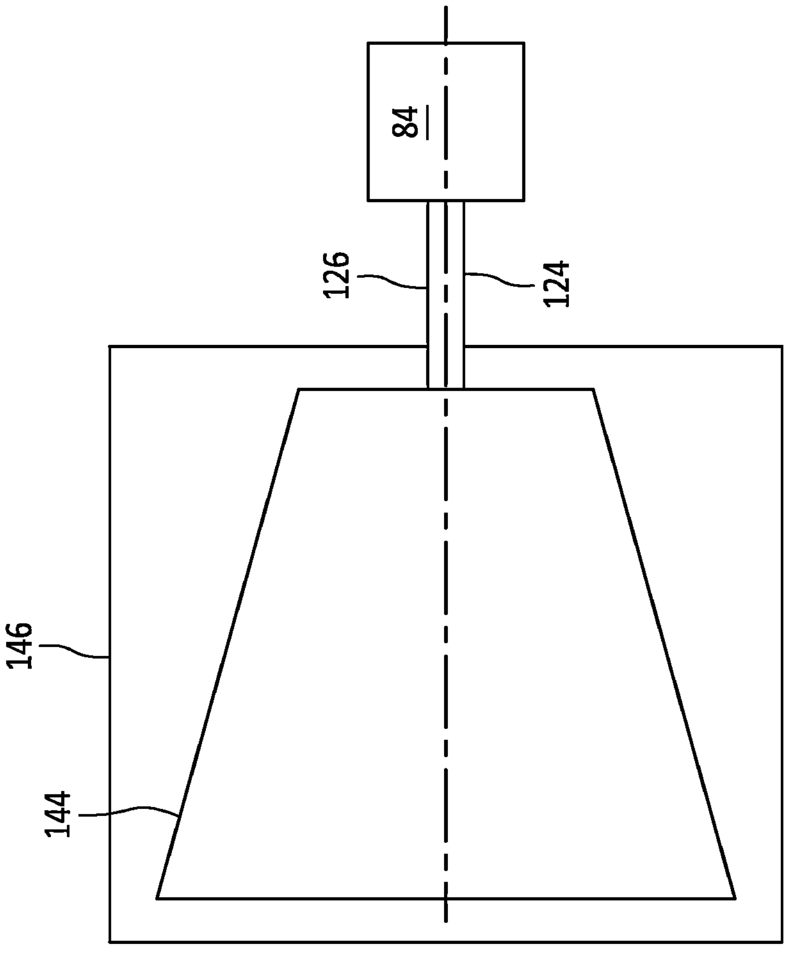
FIG. 6 is a schematic illustration of a compressor coupled to a rotating element of a geartrain.

While the power coupling system 66 is described above as including the differential electric machine 78 and the gearbox electric machine 80, the present disclosure is not limited to such an exemplary arrangement. For example, it is contemplated one or both of the electric machines 78 and 80 may be replaced by (or paired with) another type of actuator. Examples of other such actuators include, but are not limited to, a compressor or a pump (e.g., a hydraulic pump, a fuel pump, a lubricant pump, a coolant pump, etc.). For example, referring to FIG. 6, a bladed compressor rotor 144 of an auxiliary compressor 146 is coupled to the sun gear 84. This compressor 146 may be configured to provide compressed air for various propulsion system accessories and/or for other aircraft systems including, for example, an aircraft climate system. Thus, the compressor 146 of FIG. 6 is outside of the flowpaths 58 and 60 of FIG. 1. Notably, with the differential geartrain arrangement of FIGS. 2 and 3, the sun gear 84 may be operable to rotate at a substantially constant rotational velocity during aircraft powerplant operation. Thus, the actuator (e.g., the differential electric machine 78, the auxiliary compressor or pump, etc.) coupled to the sun gear 84 can advantageously be optimized for the respective rotational velocity.

The engine core may have various configurations other than those described above. The engine core, for example, may be configured with two assemblies (e.g., spools) or with three or more rotating assemblies. The engine core may be configured with one or more axial flow compressor sections, one or more radial flow compressor sections, one or more axial flow turbine sections and/or one or more radial flow turbine sections. The engine core may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core of the present disclosure may drive more than the two propulsor rotors, or a single one of the propulsor rotors and/or one or more other mechanical loads; e.g., electric machines, electric generators, electric motors, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:

a differential geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;

a first rotating assembly coupled to the differential geartrain through the carrier, the first rotating assembly comprising a first turbine rotor;

a second rotating assembly coupled to the differential geartrain through the ring gear, the second rotating assembly comprising a second turbine rotor;

a compressor rotor coupled to the differential geartrain through the sun gear;

an accessory gearbox comprising a gearbox geartrain, the first rotating assembly coupled to the differential geartrain through a first drive gear of the gearbox geartrain, the second rotating assembly coupled to the differential geartrain through a second drive gear of the gearbox geartrain; and an actuator coupled to the differential geartrain through the ring gear and fixedly coupled to the first drive gear of the gearbox geartrain.

2. The assembly of claim 1, wherein the compressor rotor is coupled to the sun gear independent of the gearbox geartrain.

3. The assembly of claim 1, wherein the actuator comprises an electric machine.

4. The assembly of claim 3, wherein the electric machine is configured to generate electricity during a mode of operation.

5. The assembly of claim 3, wherein the electric machine is configured to drive rotation of the ring gear during a mode of operation.

6. The assembly of claim 1, wherein the differential geartrain is configured such that the sun gear, the ring gear and the carrier rotate in a common direction about the axis.

7. The assembly of claim 1, further comprising a tower shaft, the first rotating assembly coupled to the carrier through the tower shaft.

8. The assembly of claim 1, further comprising a tower shaft, the second rotating assembly coupled to the ring gear through the tower shaft.

9. The assembly of claim 1, further comprising:

a propulsor rotor coupled to the second turbine rotor;

the second turbine rotor configured to drive rotation of the propulsor rotor.

10. The assembly of claim 9, wherein the propulsor rotor is a fan rotor.

11. An assembly for an aircraft powerplant, comprising: a differential geartrain including a first rotating element, a second rotating element and a third rotating element; a first rotating assembly coupled to the differential geartrain through the first rotating element, the first rotating assembly comprising a first turbine rotor; a second rotating assembly coupled to the differential geartrain through the second rotating element, the second rotating assembly comprising a second turbine rotor; an electric machine coupled to the differential geartrain through the second third rotating element; and an auxiliary compressor including a compressor rotor, the compressor rotor coupled to the differential geartrain through the third rotating element, and a shaft is fixedly coupled to the compressor rotor at a first shaft end and the third second rotating element at a second shaft end.

12. The assembly of claim 11, wherein the first rotating element comprises a carrier of the differential geartrain.

13. The assembly of claim 11, wherein the second rotating element comprises a ring gear of the differential geartrain.

14. The assembly of claim 11, wherein the third rotating element comprises a sun gear of the differential geartrain.

15. The assembly of claim 11, wherein the first rotating element comprises a carrier, the second rotating element comprises a ring gear, the third rotating element comprises a sun gear, and the differential geartrain further includes a plurality of intermediate gears;

the ring gear circumscribes the sun gear and is rotatable about an axis;

each of the plurality of intermediate gears is between and meshed with the sun gear and the ring gear;

each of the plurality of intermediate gears is rotatably mounted to the carrier; and the carrier is rotatable about the axis.

16. The assembly of claim 11, further comprising:

a propulsor rotor coupled to the second turbine rotor;

the second turbine rotor configured to drive rotation of the propulsor rotor.

17. The assembly of claim 16, wherein the propulsor rotor is a fan rotor.

18. An assembly for an aircraft powerplant, comprising:

a differential geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;

a first rotating assembly coupled to the differential geartrain through the carrier, the first rotating assembly comprising a first turbine rotor;

a second rotating assembly coupled to the differential geartrain through the ring gear, the second rotating assembly comprising a second turbine rotor;

a compressor rotor coupled to the differential geartrain through the sun gear;

an actuator coupled to the differential geartrain through the ring gear; and an accessory gearbox comprising a gearbox geartrain, the first rotating assembly and the second rotating assembly coupled to the differential geartrain through the gearbox geartrain, and the actuator is fixedly coupled to a gear of the gearbox geartrain that is not fixed to a member of the differential geartrain.

* * * * *